United States Patent [19]

Anderson

[11] 4,035,224

[45] July 12, 1977

[54] METHOD AND APPARATUS FOR FORMING A TOP ASSEMBLY

[75] Inventor: Clarence A. F. Anderson, Fruitport, Mich.

[73] Assignee: The Shaw-Walker Company, Muskegon, Mich.

[21] Appl. No.: 674,985

[22] Filed: Apr. 8, 1976

[51] Int. Cl.$^2$ .................................. B29C 17/00
[52] U.S. Cl. .................. 156/475; 156/216; 156/488; 156/492; 156/499
[58] Field of Search .......... 156/216, 213, 443, 468, 156/475, 477 R, 479, 486, 492, 212, 217; 53/198 R, 218; 270/61 R

[56] References Cited

U.S. PATENT DOCUMENTS

| | | | |
|---|---|---|---|
| 2,064,658 | 12/1936 | Grieb et al. | 156/486 |
| 2,937,689 | 5/1960 | Peterson | 156/216 X |
| 3,009,201 | 11/1961 | Hansen | 156/486 X |
| 3,028,275 | 4/1962 | Peterson et al. | 156/492 X |
| 3,387,841 | 6/1968 | Menell et al. | 270/61 R |
| 3,392,074 | 6/1968 | Bartron | 156/216 |
| 3,580,770 | 5/1971 | Dyal | 156/216 |
| 3,616,076 | 10/1971 | Gepkens | 156/216 X |
| 3,888,613 | 6/1975 | Fries et al. | 156/216 X |
| 3,905,861 | 9/1975 | Fritz | 156/492 X |

Primary Examiner—David A. Simmons
Attorney, Agent, or Firm—Kinzer, Plyer, Dorn & McEachran

[57] ABSTRACT

A method and an apparatus for forming a top assembly for desks, tables, credenzas and similar items having a core and an outer layer of a thin hard laminated plastic sheet adhered to the core. The thin hard laminated plastic sheet covers the top surface of the core and is wrapped around the side and end walls and undersurface edges thereof. The laminated plastic sheet is unbroken by seams or rims along the side and end edges of the top assembly. In forming the top assembly, a one-piece thin hard laminated plastic sheet is adhered by cement to the top surface of the core and is positioned so that side and end portions of the laminated plastic sheet extend beyond the side and end edges of the top surface. A selected extending side or end portion of the laminated plastic sheet is heated to soften it and make it pliable. The softened laminated plastic is bent downwardly and pressed into contact with the adjacent adhesive coated side or end wall of the core thereby adhering the laminated plastic sheet to that wall. The bending and pressing are continued thereby bending the laminated plastic sheet inwardly to adhere it to the edge of the undersurface of the core. This operation is repeated for each side or end of the top assembly. The apparatus used includes a hydraulic actuating clamping bar for holding the top assembly in place during bending operations and a hydraulic actuated bending or forming bar which bends the softened laminated plastic sheet downwardly and wraps it around and under the side and end walls of the top assembly core. During bending operations, the forming bar pivots about an axis which is moving in an arcuate path. The movement of the forming bar in the arcuate path is opposed by spring means.

4 Claims, 5 Drawing Figures

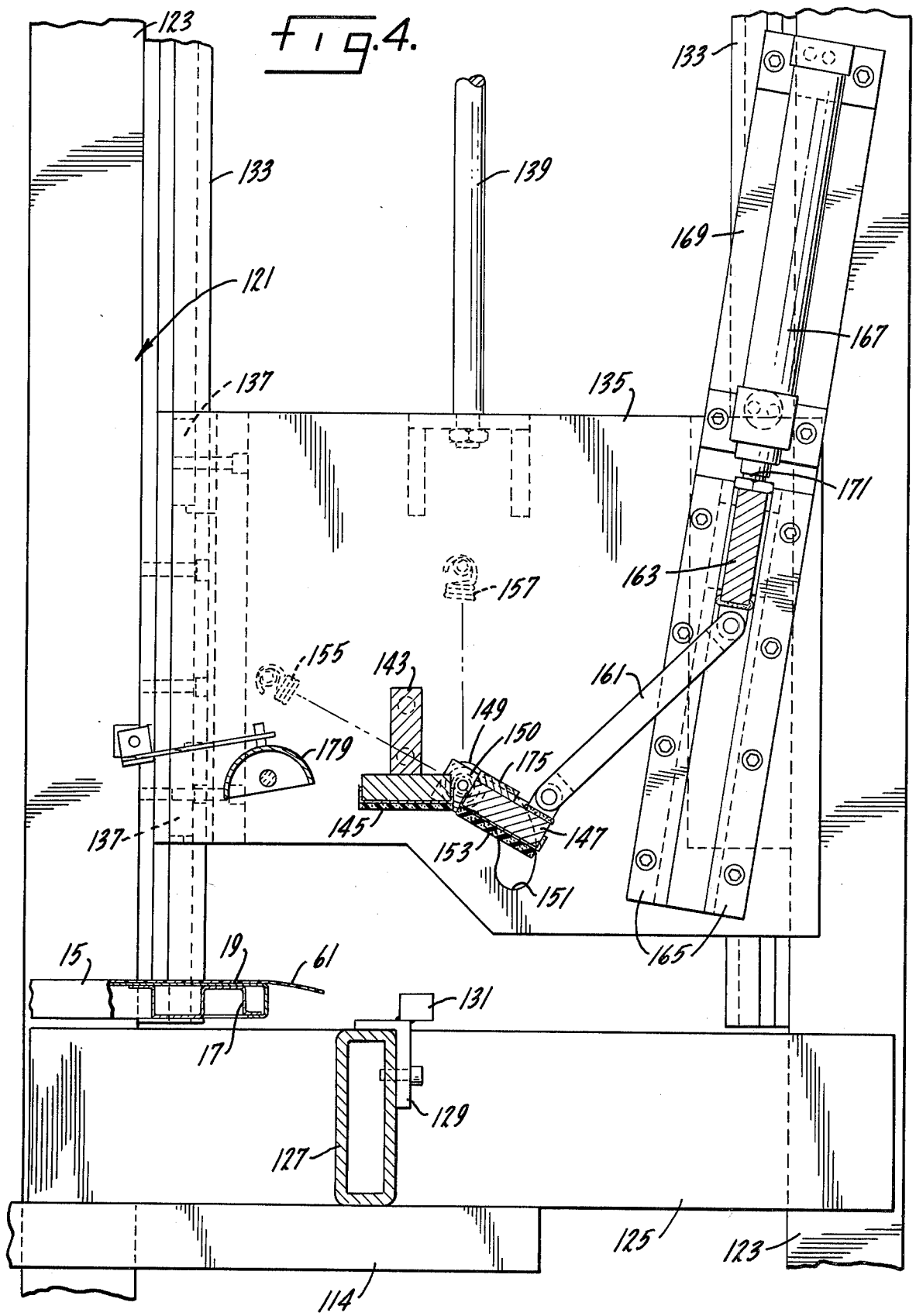

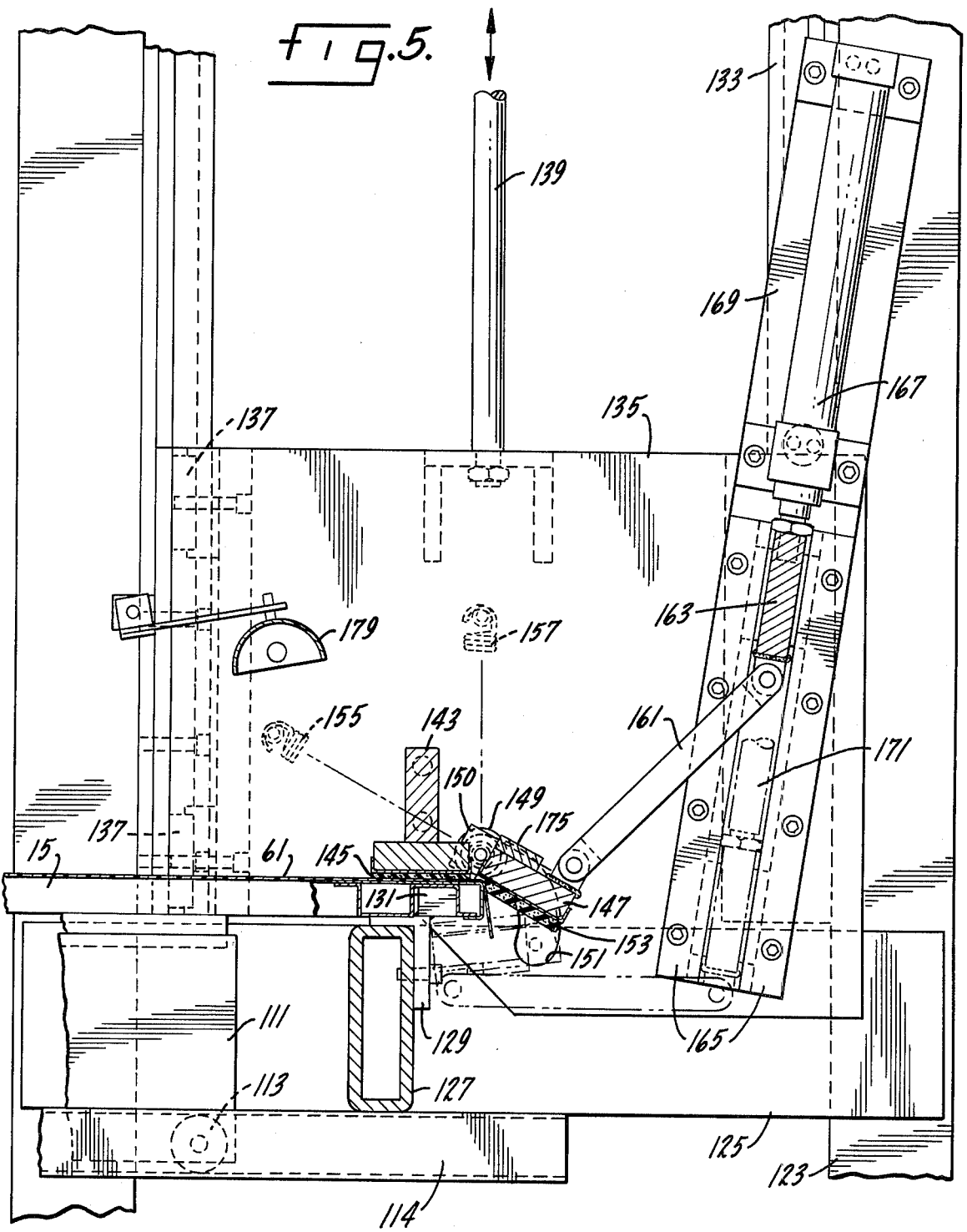

METHOD AND APPARATUS FOR FORMING A TOP ASSEMBLY

SUMMARY OF THE INVENTION

This invention is directed to a method and an apparatus for forming a top assembly for desks, tables, credenzas, and similar items. It is particularly concerned with a method and an apparatus for applying a thin hard laminated plastic sheet to the side and end walls and undersurface edges of a top assembly core and thus eliminating the need for seams or rims at the top and bottom edges of the end and side walls of the core.

An object of this invention is to apply a laminated plastic sheet to the end and side walls of a core, preferably a metal core, by wrapping the laminated plastic sheet downwardly around the side and end walls thereof.

Another object of the invention is a method and apparatus for applying a thin hard laminated plastic sheet to side and end walls of a top assembly core to form a seamless covering on the side and end walls of the top assembly.

Another object is a method and apparatus for wrapping a laminated plastic sheet downwardly around side and end walls of a core, which walls extend at right angles to the top surface of the core.

Other objects may be found in the following specification, claims and drawings.

BRIEF DESCRIPTION OF THE DRAWINGS

The invention is illustrated more or less diagrammatically in the following drawings wherein:

FIG. 4 is a vertical cross-sectional view of an apparatus for performing the method of this invention; and FIG. 5 is a view similar to FIG. 4 showing another step in the method of this invention in solid lines and showing the final bending step in phantom lines.

DESCRIPTION OF THE PREFERRED EMBODIMENT

Figure 2:
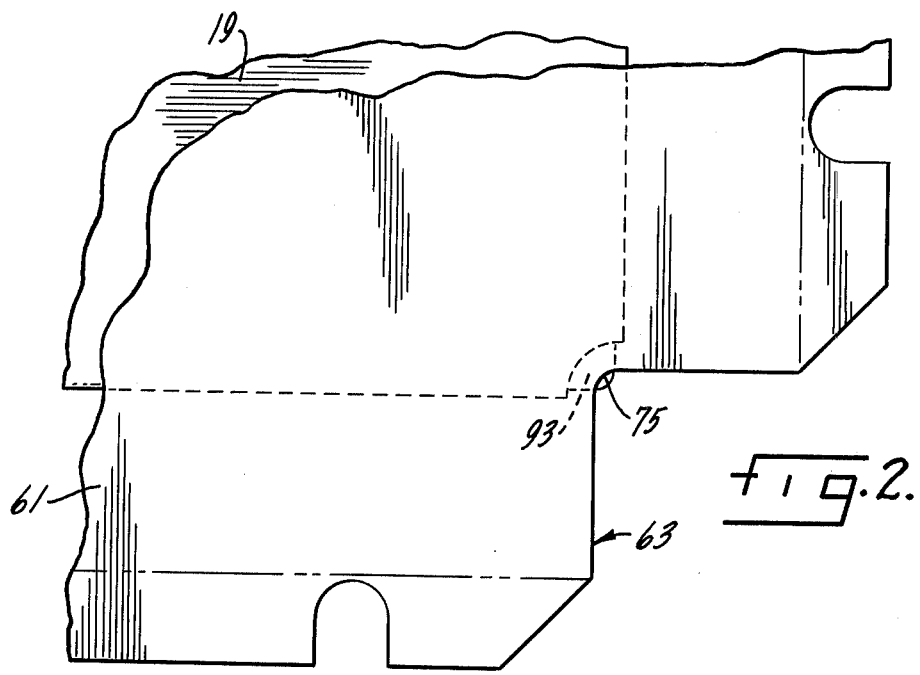
FIG. 2 is a partial top plan view of a corner of top assembly core with the laminated plastic sheet positioned thereon.
Figure 3:
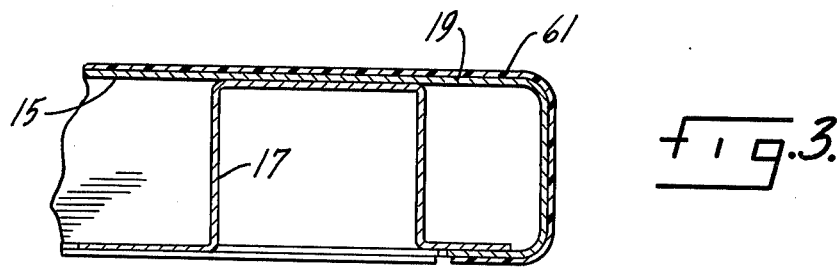
FIG. 3 is a cross-sectional view taken through the completed top assembly.

The method of this invention is directed to the forming of a top assembly for desks, tables, credenzas and similar items. It includes the step of adhering a one piece thin hard laminated plastic sheet to the top wall of the top assembly core with side and edge portions of the laminated plastic sheet projecting beyond the side and end edges of the core in the manner shown in FIG. 2 of the drawings. The adhering of the thin hard laminated plastic sheet 61 to the surface of the top planar wall 19 of the sheet metal core 15 may be accomplished in any conventional manner. Preferably, a contact cement such as Bond Master No. G701 sold by National Starch Company is first applied by spraying to the outer surfaces of the sheet metal housing 15 and the undersurface of the laminated plastic sheet 61. The contact cement on the sheet metal housing and the laminated plastic sheet is dried to remove solvents.

The cement coated laminated plastic sheet 61 is adhered to the cement coated top surface 19 of the sheet metal housing 15 by passing the sheet metal housing and the laminated plastic sheet through a squeeze roller while applying pressure of approximately 2,000 lbs. with the roller. These steps and apparatus for performing them are conventional and have not been shown in the drawings. It is important that the laminated plastic sheet 61 is oriented on the sheet metal housing 15 in the manner shown in FIG. 2 in which the previously die-cut notches 63 of the laminated plastic sheet are located at the corners of the sheet metal housing. The inside curved portion of the 75 of each notch 63 is positioned just inwardly of the outer surface of a reinforcing corner member 93 of the sheet metal housing 15.

In the next step of this method, the sheet metal housing 15 and the laminated plastic sheet 61 adhered to the top surface thereof are supported on a dolly 111 that moves on rollers 113 riding on spaced conveyor tracks 114. The dolly is used to move the sheet metal housing to a heating position for one projecting portion of the laminated plastic film which is shown in solid lines in FIG. 1 where the laminated plastic sheet is positioned under a heating source. After the laminated plastic sheet has been heated sufficiently so that the projecting portion is soft and pliable, the top assembly housing and laminated plastic sheet are moved to the forming position shown in phantom lines in FIG. 1.

An apparatus for wrapping the thin hard laminated plastic covering 61 around the end side walls and undersurface edge of a top assembly is shown in FIGS. 4 and 5 of the drawings. The apparatus includes an elongated rectangular frame 121 having upstanding posts 123 at each of the four corners thereof. A horizontally extending beam 125 connects a pair of corner posts at each end of the frame. A beam 127 extends longitudinally between the end beams 125 and this beam is located closer to the front of the machine than to the rear. An angle iron 129 rests on the beam 127 and functions as a workbed. A number of locating pins 131 are fastened to the top of the inverted angle iron and are spaced around the length thereof. These pins locate the sheet metal housing 15 during bending of the laminated plastic sheet.

Vertical guides 133 are fastened to the corner posts 123. End plates 135 located at opposite ends of the frame 121 are guided for vertical movement in the guides 133 by means of attached bronze bearings 137 which ride in the guides. The end plates 135 are moved vertically by rods 139 extending from hydraulic cylinders (not shown) which are mounted on the frame 121 at opposite ends thereof. A clamping member 143 of inverted T-shaped cross section is mounted on and extends between the end plates 135. A rubber pad 145 is fastened to the undersurface of the clamping member and this pad can be moved into engagement with the laminated plastic sheet 61 adhered to the top surface 19 of the sheet metal housing 15. As is shown in FIG. 4 of the drawings, the clamping member 143 moves down on the sheet metal housing and laminated plastic sheet in alignment with the workbed 129 and the positioning members 131.

An elongated bending or forming bar 147 for the laminated plastic sheet extends between the end plates 135 and is guided for movement along an arcuate path by means of rollers 149 journalled in arms 150 attached to opposite ends of the bending bar. The rollers ride in arcuate slots 151 formed in the end plates. The rollers are located on the side of the forming bar which faces the clamping bar 143 when the forming bar is at the top of the arcuate path. A rubber forming pad 153 is fastened to the lower surface of the bending bar. Tension springs 155 and 157 are attached to the end plates 135 and to the rollers. These springs maintain tension on the bending bar during its entire arcuate travel. The tension forces exerted by the springs maintain the forming bar and its forming pad firmly against the laminated plastic sheet and metal core as the forming bar is moved around the ends and side walls of the sheet metal housing.

A number of connecting links 161, spaced apart along the length of the bending bar 147, are each pivotally connected to the bending bar at the side of the bending bar which faces away from the clamping bar 143 when the bending bar is at the top of the arcuate path. The opposite ends of the connecting links are pivotally connected to a drive bar 163 which moves in inclined guide members 165 affixed to the end plates 135. Hydraulic cylinders 167 are mounted on brackets 169 also attached to the end walls 135. Piston rods 171 extend from the hydraulic cylinders 167 and connect to the drive bar 163 at the opposite ends thereof. A strip heater element 175 is mounted on the upper surface of the bending bar 147. The strip heater extends substantially along the entire length of the bending bar. A strip heater element found suitable for this purpose is sold under the designation "CHROMALOX" Model SE-92 and has an output of 2500 watts. A heater 179 for softening the laminated plastic sheet before bending is also provided. This heater applies heat to the laminated plastic sheet when it is in the position shown in FIGS. 1 and 4 of the drawings. A heater suitable for this purpose is sold by Aitken Products, Inc. and designated as "CALROD" Model no. EXS 3604. This heater has an output of 3,600 watts.

Figure 1:
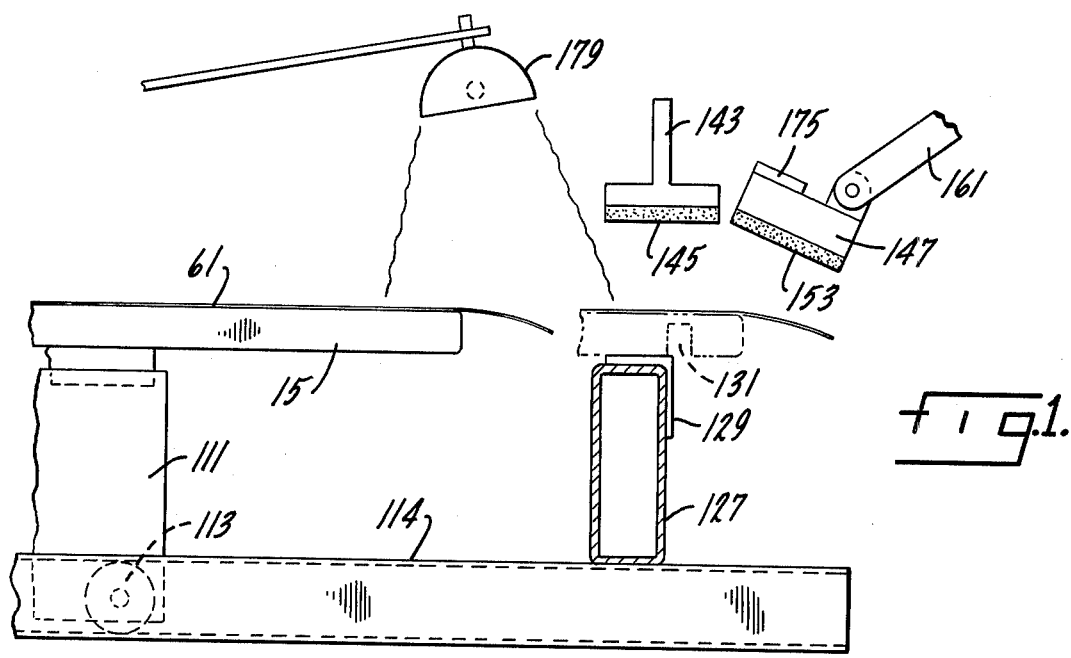
FIG. 1 is a somewhat schematic drawing showing the top assembly and laminated plastic sheet in the heating position in solid lines and in position prior to bending in phantom lines.

A detailed explanation of the method of this invention using the apparatus described is as follows:

The first steps in the method of my invention are conventional and are not shown. These involve the cutting of the laminated plastic sheet to the proper size and the adhering of this sheet to the top surface 19 of the sheet metal housing 15 using contact cement and a pressure roll. As shown in FIGS. 1 and 4 of the drawings, the sheet metal housing 15 with the precut laminated plastic sheet 61 adhered to the top surface 19 is moved into the heating position beneath the heating element 179. The projecting portion of the laminated plastic sheet is heated until it becomes soft and pliable. The heating time will vary in accordance with the type of laminated plastic sheet used, the size of the heating element, and the distance of the heating element from the laminate. In the preferred embodiment of the invention, a laminated plastic sheet in the form of a flexible polyester resin laminate having a thickness of approximately 0.030 inches is used. The laminate is sold by Conolite Division/Woodall Industries, Inc. of Carpentersville, Ill. under the trademark "CONOLITE". The heating element 179 is mounted approximately 6¾ inches almost directly above the laminated plastic sheet.

After the projecting portion of the laminated plastic sheet 61 has been softened, the sheet metal housing is moved to the position shown in phantom lines in FIG. 1 and in solid lines in FIG. 5 of the drawings. In this position, the locating pins 131 of the workbed 129 fit into a channel 17 of the sheet metal housing, thus properly positioning the sheet metal housing under the clamping member 143. Hydraulic cylinders (not shown) are then actuated moving the piston rods 139 downwardly. Downward movement of the piston rods moves the side plates 135 and the clamping member 143 downwardly until the rubber pad 145 of the clamping member engages the laminated plastic sheet 61 and forces it and the sheet metal housing 15 tightly into contact with the workbed 129 and the supporting dolly 111.

The downward movement of the end plates 135 also carries the drive bar 163 and its inclined guide members 165 downwardly. The links 161 and bending bar 147 are moved downwardly with the end plates from the position shown in FIG. 4 to the position shown in solid lines in FIG. 5. During this downward movement, the rubber pad 153 of the bending bar engages the softened portion of the laminated plastic sheet 61 which extends beyond the peripheral edges of the top assembly and forces this portion downwardly at an angle thereby adhering the laminated plastic sheet to the rounded small radius top edge of the sheet metal housing. The forming bar 147 is heated by its strip heater 175 to assist in maintaining the softness and pliability of the laminated plastic sheet 61 during bending. When the forming bar is in this position, it is held at the upper end of the arcuate guide slots 151 by the biasing action of the tension springs 155 and 157.

To smoothly wrap the laminated plastic sheet 61 around the side wall and undersurface edge of the sheet metal housing 15, the forming bar 147 is moved through an arc described by the rollers 149 moving in the arcuate slots 151. This arrangement forces the forming bar 147 to move around and under the side or end wall of the sheet metal housing to the position shown in phantom lines in FIG. 5. During this movement, the forming bar pivots about an axis extending through the rollers as the axis moves along the arcuate path of the slots 151. Movement of the forming bar 147 is accomplished by actuation of the hydraulic cylinders 167 which moves the piston rods 171 downwardly as viewed in the drawings. Movement of the piston rods 171 moves the links 161 from the position shown in solid lines to the position shown in phantom lines in FIG. 5.

During the movement of the forming bar 147 around the side or end wall and undersurface edge of the sheet metal housing, the springs 155 and 157 are exerting a restraining force on the forming bar. The restraining force exerted by these springs maintains the forming bar 147 and its forming pad 153 in tight engagement with the laminated plastic sheet 61 as it is being pressed into contact with the wall and undersurface edge of the sheet metal housing. Additionally, after completion of the wrapping stroke of the bending bar 147, the springs 155 and 157 assist in returning the forming bar to its starting position at the top of the arcuate slots 151.

To complete the wrapping cycle, the piston rods 171 are retracted into the hydraulic cylinders 167 thereby raising the forming bar 147 to the upper end of its arcuate path of travel. The end plates 135 are then moved to their raised position by retraction of the piston rods 139. The sheet metal housing 15 may then be lifted from the positioning pins 131 and rotated to position the next projecting side or end edge of the laminated plastic sheet to be wrapped around the sheet metal frame in the heating position. The wrapping cycle is repeated for each side and end wall of the top assembly. When the laminated plastic sheet 61 is completely wrapped around the sheet metal housing 15, the cut-out corners 63 of the laminated plastic sheet form a gap at each corner of the completed top assembly. The gaps may be covered by caps (not shown) which fasten to the reinforcing members 93 which are located in the corners of the sheet metal housing.

The method and apparatus of this invention may also be adapted to wrap laminated plastic sheets around cores made of materials other than sheet metal. For example, the core may be made from wood, plywood, particle board, etc. In applying the method of this invention to cores other than the sheet metal core shown and described, it should be appreciated that it may be necessary to adjust the operating temperatures and pressures used to suit the characteristics of the core material selected.

I claim:

1. An apparatus for adhering a seamless laminated plastic sheet to the end and side walls and undersurface edges of a core of a top assembly for a desk, table, credenza or similar item, said apparatus including:
   means for supporting a top assembly core in a predetermined location with said core having a laminated plastic sheet adhered to the top surface thereof with portions of said sheet projecting beyond the periphery of said core,
   a clamping member adapted to move vertically into clamping relationship with said laminated plastic sheet to clamp said top assembly core and said laminated plastic sheet against said supporting means,
   a pair of arcuate guides located adjacent opposite ends of said clamping member and movable vertically with said clamping member,
   a bending bar for the elongated plastic sheet mounted at its opposite ends in said guides for movement along said guides with said bar being pivotal about an axis located adjacent an elongated side thereof,
   said bending bar including a flat, planar surface facing said top assembly core and positioned to press said elongated plastic sheet into contact with the top edges of said side and end walls when said bending bar is located at the upper ends of said arcuate guides and said clamping member is in its lowered clamping position, and
   means connected to said bending bar to pivot said bending bar about said pivotal axis and to move said bending bar along said guides with said flat planar face of bending bar maintaining engagement with said elongated plastic sheet to force said plastic sheet into contact with the side and end walls and undersurfaces of said top core in a motion which is continuous from the top edges of said top and side walls through the undersurface edges of the core assembly.

2. The apparatus of claim 1 in which the movement of said bending bar along said guides is resisted by tension applying means connected to said pivotal axis.

3. The apparatus of claim 1 in which said flat, planar surface of said bending bar is formed of rubber.

4. The apparatus of claim 1 in which said means connected to said bending bar to pivot said bending bar is connecting adjacent the elongated side thereof opposite to the elongated side adjacent said axis.

* * * * *